(12) United States Patent
Andonian et al.

(10) Patent No.: US 8,191,592 B2
(45) Date of Patent: Jun. 5, 2012

(54) TWO-PIECE TIRE

(75) Inventors: Archie Arsavir Takfor Andonian, Hudson, OH (US); Kevin Christopher Legge, Doylestown, OH (US); Robert Anthony Neubauer, Medina, OH (US); Terry John Waibel, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 968 days.

(21) Appl. No.: 12/185,366

(22) Filed: Aug. 4, 2008

(65) Prior Publication Data

US 2010/0024936 A1 Feb. 4, 2010

(51) Int. Cl.
*B60C 11/02* (2006.01)

(52) U.S. Cl. ...... 152/209.6; 152/454; 152/531; 152/535; 152/538

(58) Field of Classification Search ......... 152/209.6, 152/454, 531, 535, 538
See application file for complete search history.

(56) References Cited

U.S. PATENT DOCUMENTS

| | | | |
|---|---|---|---|
| 3,224,481 A * | 12/1965 | Lugli | 152/176 |
| 3,474,848 A | 3/1970 | Pirelli | |
| 3,703,202 A | 11/1972 | Maiocchi | |
| 4,202,394 A * | 5/1980 | van der Burg | 152/531 |
| 4,215,734 A * | 8/1980 | Suzuki et al. | 152/209.1 |
| 4,688,615 A * | 8/1987 | Lee | 152/531 |
| 6,561,241 B2 * | 5/2003 | Rayman | 152/531 |
| 7,093,634 B2 * | 8/2006 | Rayman et al. | 152/209.1 |
| 7,252,128 B2 * | 8/2007 | Ferlin | 152/527 |

FOREIGN PATENT DOCUMENTS

| | | |
|---|---|---|
| EP | 1632365 | 8/2006 |
| JP | 11151909 | 8/1999 |
| JP | 11151910 | 8/1999 |

\* cited by examiner

*Primary Examiner* — Justin Fischer
*Assistant Examiner* — Robert Dye
(74) *Attorney, Agent, or Firm* — David L King

(57) ABSTRACT

A two-piece tire assembly 10 with a removable tread belt 12 for installing about the circumference of a tire carcass 14 is provided. The two-piece tire assembly 10 includes a tread belt 12 has a belt structure 90 having two or more belt layers 100, 110, 120, 130 each layer having one or more belts. The tread belt 12 has a radially inner surface 70 having one or more protruding circumferential ribs 72 or grooves 74 that fit into complementary grooves 18 or ribs 19 on an outer crown surface of the tire carcass 14. The tread belt 12 has a maximum axial belt width W at a radially inner surface. The carcass 14 has a maximum section width SW and ply line 20 having a maximum width P wherein $W \leqq 0.95P$, $BW \leqq 5\ 0.85P$ and $P < SW$.

7 Claims, 11 Drawing Sheets

TWO-PIECE TIRE

FIELD OF THE INVENTION

This invention relates to pneumatic tires with removable tread belts and more particularly, to very large, two-piece tires for heavy equipment operation.

BACKGROUND OF THE INVENTION

Very large two-piece tires, in which a removable tread belt is mounted upon a pneumatic structure, have been designed for use on large earthmover vehicles. The large two-piece tires are subjected to high stress and loads under harsh environmental conditions such as in rock quarries, mines, foundries, and other areas where tires are subjected to puncture-producing and wear-inducing conditions.

Two engineering challenges separate the two-piece tires from standard one-piece tires. The first engineering challenge is to retain the outer tread belt on the carcass, which requires enough interfacial pressure between the tread belt and carcass. The second engineering challenge is to ensure that the tread has adequate circumferential stillness to restrain the diametric growth of the carcass. The tread belt must also have enough flexural compliance to have a nonzero interfacial pressure at the leading and trailing edges of the footprint, and low circumferential compliance to compress the belt package in the footprint in the circumferential direction. These opposing requirements make it difficult to design a two-piece tire which is utilized under heavy load conditions.

With the continual drive to improve earthmover performance, there is a continuing need to provide novel methods and tire designs for improving earthmover tire durability. The present invention is directed to an improved pneumatic tire and removable tread belt assembly with which the frequency of premature tire failure is thought to be substantially reduced while the overall useful life of the product is dramatically increased.

SUMMARY OF THE INVENTION

A two-piece tire assembly with a removable tread belt for installing about the circumference of a tire carcass is provided. The two-piece tire assembly includes a tread belt comprised of two or more belt layers, each layer having one or more belts, wherein the tread belt when viewed in a cross section has a maximum width W as measured at a radially inner surface of the tread belt. The tread belt includes one belt layer having 0 degree cord angles relative to an equatorial plane (EP) of the tread belt and two belt layers having cords of opposite cord angles greater than 20 degrees, preferably in the range of 20 to 45 degrees. An optional fourth top belt layer has cords oriented transverse or 90 degrees to the equatorial plane EP. The tread belt has the radially inner surface having one or more protruding circumferential grooves or ribs that fit into complementary grooves or ribs on an outer crown surface of the tire carcass. The width W of the tread belt when assembled to the carcass is substantially narrower than the maximum section width of the tire carcass. Preferably, the tire carcass has a radial ply cord reinforcement layer extending from a pair of bead cores in each sidewall across the crown of the carcass to form an inflated ply line. The inflated ply line has a maximum width P measured between the sidewalls at RhoM (radial distance corresponding to the maximum tire section width) wherein the maximum width of the tread belt W is less than the width P, preferably less than 95 percent of P. This design concept results in a stable tread supported by the pneumatic pressure when the footprint load is applied, eliminates the possibility of tread chunking at the belt edge and provides a superior cooler running tire with improved wear rates. The reduced tread width truncates the outer edges of the tread belt where the interfacial pressure is very low between the tread belt and the inflated tire carcass and eliminates the possibility of gaps on either side of the tire's footprint. The reduction in carcass shoulder gauge which accompanies the reduced tread width decreases the heat generation in the upper shoulder, reduces tire flexural deformations in the lower sidewall, improves durability in the bead area and reduces the possibility of chafing between tire and rim.

DEFINITIONS

The following definitions are controlling for the disclosed invention.

"Apex" means a non-reinforced elastomer positioned radially about a bead core.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by the ply cords and shaped, with or without other reinforcement elements such as flippers, chippers, apexes, toe guards and chafers, to fit the design rim.

"Bias ply tire" means a tire having a carcass with reinforcing cords in the carcass ply extending diagonally across the tire from bead core to bead core at about 25-50 angle with respect to the equatorial plane of the tire. Cords run at opposite angles in alternate layers.

"Circumferential" means lines or directions extending along the perimeter of the surface of the annular tread perpendicular to the axial direction.

"Chafers" refers to narrow strips of material placed around the outside of the bead to protect cord plies from degradation and chafing caused by movement of the rim against the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface under load and pressure.

"Inner liner" means the layer or layers of elastomer or other material that form the inside surface of a tubeless tire and that contain the inflating gas or fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the diameter of the rim base at the location where the bead of the tire seals.

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial" and "radially" mean directions extending radially toward or away from the axis of rotation of the tire.

"Radial-ply tire" means a belted or circumferentially-restricted pneumatic tire in which the ply cords which extend from bead to bead are laid at cord angles between 65 and 90 with respect to the equatorial plane of the tire.

"RohM line" the RhoM line is defined as half way between the ply line bead pivot point BP and the ply line centerline C and in the preferred embodiment tire RhoM is coincident with the radial height at the maximum section width U.S. Pat. No. 5,429,168 more fully describes and defines the calculation of the RhoM line which is incorporated herein by reference in its entirety.

"Section height (SH)" means the radial distance from the nominal rim diameter to the outer diameter of the tire at its equatorial plane.

BRIEF DESCRIPTION OF THE DRAWINGS

The invention will be described by way of example and with reference to the accompanying drawings in which.

DETAILED DESCRIPTION OF THE INVENTION

Erosion of the interface between the tread belt and carcass in two-piece tires is a major design challenge. Erosion occurs when the shear stress between the tread belt and carcass exceeds a threshold value. This phenomenon can be expressed as Max. Shear Stress at Interface=$\mu$*Interfacial Contact Pressure (Equation 1)

where the coefficient of friction, $\mu$ is a function of pressure, temperature, and the contact medium (dirt, mud, water etc.). Slip occurs when the left hand side of Equation 1 becomes greater than the right hand side. To delay the onset of slip and minimize erosion between the carcass and tread belt, one must either reduce the shear stress developed at the interface or increase the interfacial contort pressure.

The difference between the circumferential stiffness of carcass and that of belt structure needs to be minimized to reduce the shear stress between the carcass and the tread belt. This is a challenging preposition since the carcass must be compliant in the circumferential direction to be able to expand into the tread belt. Moreover, the tread belt must have sufficient circumferential stiffness to stay on the carcass and provide reasonable dimensional stability.

Figure 1:
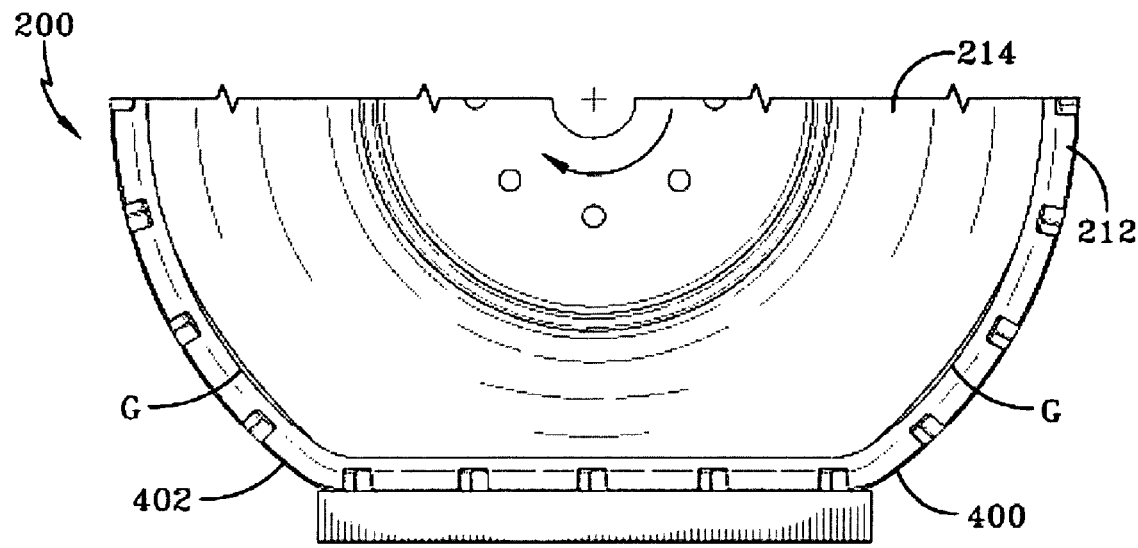
FIG. 1 is a side view showing a prior art two-piece tire having linear or flat belts in the tread belt going over a flat ramp and emphasizes the formation of gaps between the carcass and the tread belt close to the leading and trailing edges.
Figure 1A:
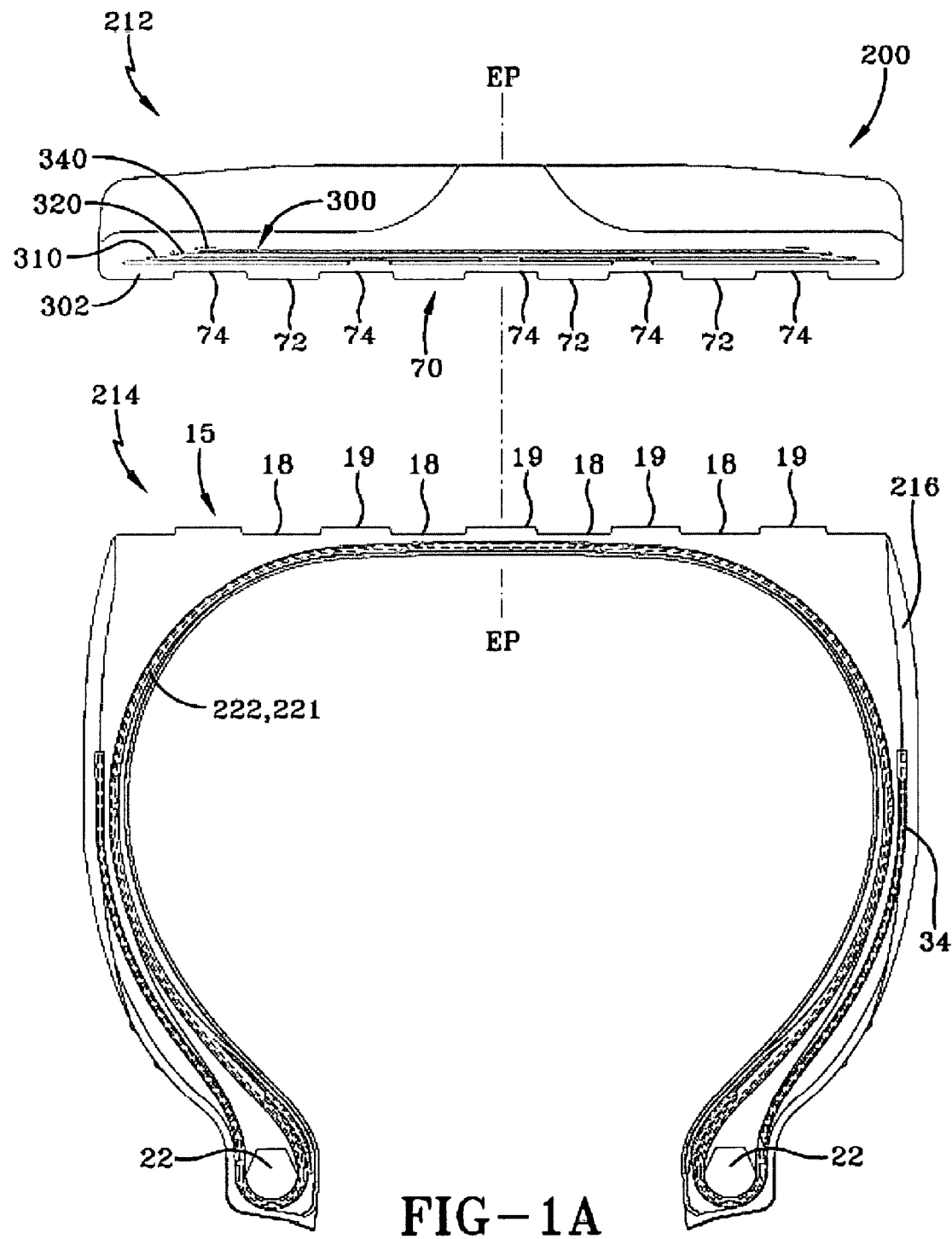
FIG. 1A is a cross-sectional view of the prior art two-piece tire of FIG. 1.
Figure 3:
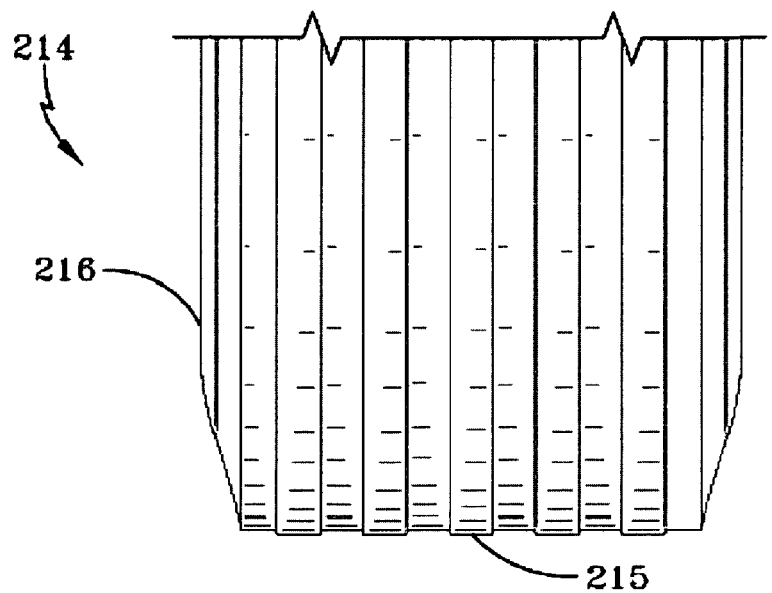
FIG. 3 partial plan view showing a prior art 45.00R57 two-piece tire carcass with 25 psi inflation pressure.

FIG. 1 shows a prior art two-piece tire 200 as defined in FIG. 1A with a belt structure 300 having linear or flat belt layers 302, 310, 320 and 340 in the tread belt 212 going over a flat ramp and emphasizes the formation of gaps (G) between the carcass 214 and the tread belt 212 close to the leading edge 400 and trailing edge 402 in the loaded tire footprint. FIG. 1 suggests that the interfacial pressure at the leading and trailing edges is very low if not zero.

According to the principles of tire mechanics, the maximum value of longitudinal compressive strain in the footprint can be approximated as $\delta/3D$, where $\delta$ is the tire deflection under the foot prim load and D is the outer diameter of the tire. The carcass 214 of the two-piece tire assembly 200 is very compliant in the circumferential direction particularly in the crown region 215 and can easily deform in the footprint if compressive stresses are present. The tread belt 212, however, is relatively stiff in the circumferential direction especially when a 0 degree belt is used. Therefore, the tread belt 212 can not be compressed as much as the carcass 214 in the circumferential direction. Shear stress develops in the footprint between the tread belt 212 and carcass 214 as a result of this difference in stiffness. Under normal use (with no breaking or driving torque acting on the wheel) the shear stress approaches its maximum value at the leading and trailing edges 400, 402 and is zero at the center of footprint. The gap (G) between the tread belt 212 and carcass 214, outside the leading and trailing edges 400, 402, clearly suggests the relative displacement at the interface due to the interfacial shear.

Relative movement between the carcass 214 and the tread belt 212 is not desirable when the two surfaces are in contact since it produces wear. To minimize wear or erosion at the interface the left hand side of Equation 1, the shear stress, has to be reduced at the onset of slip. Since the circumferential stiffness of the carcass 214 can not be increased, the hoop stiffness of the tread belt 212 needs to be adjusted. The composite stiffness of the belt layers in the circumferential direction can not be changed significantly if zero degree belt layers are used.

To eliminate the possibility of slip and minimize erosion between the carcass 214 and tread belt 212, one can either reduce the shear stress developed at the interface below a threshold level or increase the interfacial contact pressure. The structural fundamentals affecting the interfacial contact pressure are described as follows.

Effect or Ply Line Ellipticity on Interfacial Pressure Distribution

Figure 2:
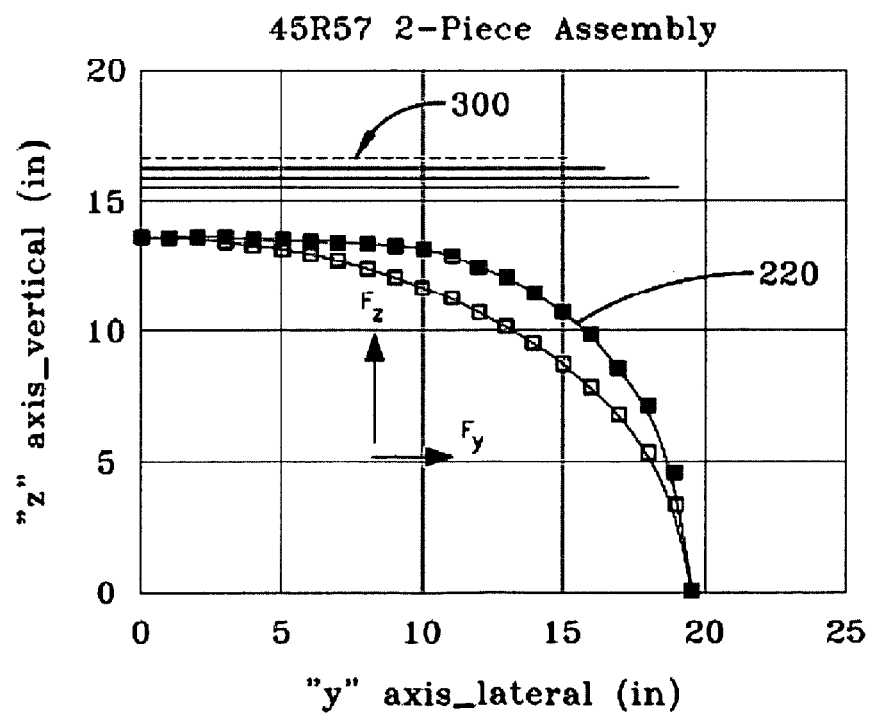
FIG. 2 is a graphical representation showing a schematic view of a prior art 45.00R57 2-piece tire assembly.

FIG. 2 schematically shows a 45.00R57 two-piece prior art tire assembly. It gives the actual position of the ply line between the crown 215 center and the mid sidewall 216 as well as the location of the 4 belt structure 300. FIG. 2 also provides an elliptic fit to the ply line 220 between the crown 215 center and mid sidewall 216 where the semi major axis of the ellipse is 19.6" (one half the cavity width) and the semi minor axis is 13.6".

The force per unit circumferential length pushing this quadrant of the carcass 214 up, $F_2$, can be written in terms of the inflation pressure and the semi major axis of the ellipse as $$F_2 = (\text{inflation pressure}) * (19.6") \quad \text{(Equation 2)}$$

The force per unit circumferential length pushing this quadrant of the carcass 214 from left to right, $F_y$, can be written in terms of the inflation pressure and the semi minor axis of the ellipse as $$F_y = (\text{inflation pressure}) * (13.6") \quad \text{(Equation 3)}$$

Equations 2 and 3 suggest that $F_2 > F_y$. When the tire 200 is inflated the crown 215 region will expand and the mid sidewall will contract since the ply length will not change significantly. A tread belt 212 with high circumferential stiffness will restrict this ply line expansion in the crown and produce the interfacial contact pressure.

Thus, it is beneficial to have a ply line 220 with high ellipticity. The amount of force exerted by the ply line 220 on the tread belt 212 is expected to increase with increasing ply line ellipticity.

As the carcass 214 is inflated, it will exert a radial force on the tread belt which restricts the growth of carcass 214 in the crown area. Part of the inflation pressure will be conveyed from the ply 222 to the tread belt 212 depending on the geometry of the ply line 220 and the relative placement of the belt layers with respect to the ply line 220. Since the inflation pressure always acts perpendicular to the ply line 220, the incremental force representing the effect of inflation pressure will act perpendicular to the ply line 220 at any point along the ply 222. The inflation pressure will push the ply 222 out and produce tension in the ply cords 221.

The amount of compression developed outside the ply (e.g. between the ply and the belt package) will depend on the amount of ply movement and the level of constraint in the direction of ply movement. For example, the ply movement will not produce any compression in the sidewall region 216 since the material outside the ply 222 is not constrained and it is free to move.

Figure 4:
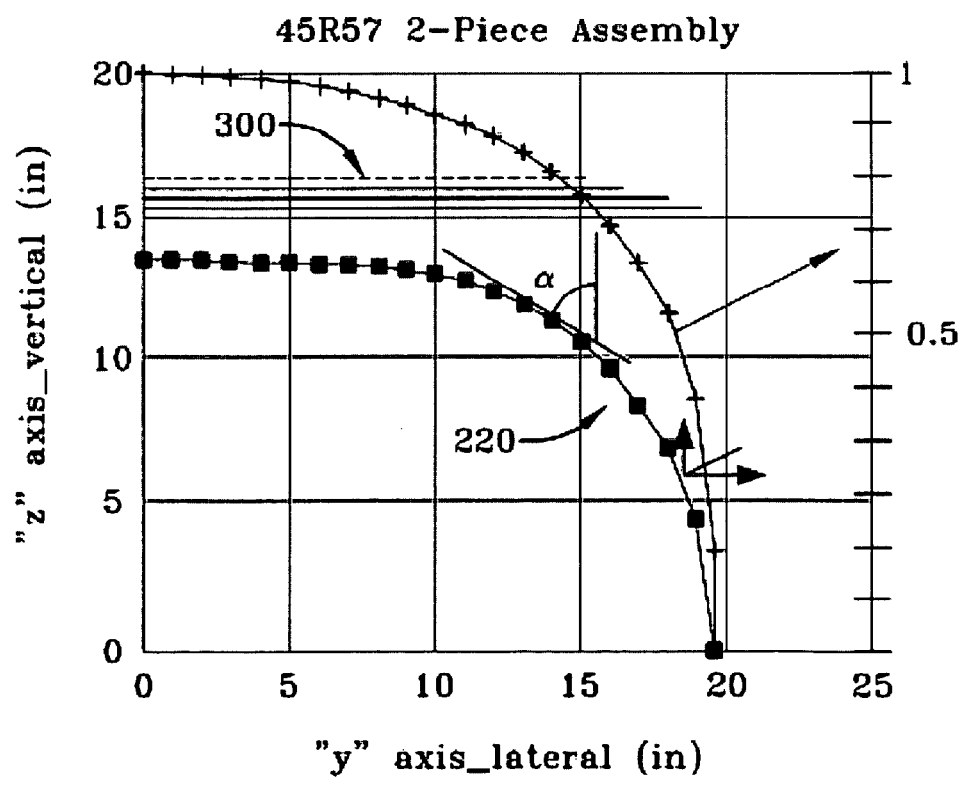
FIG. 4 is a graphical representation showing the incremental force representing the effect of inflation pressure decomposed into its vertical and horizontal components of an exemplary prior art 45.00R57 two-piece tire assembly.

The incremental force, representing the effect of inflation pressure can be decomposed into its vertical and horizontal components as shown in FIG. 4. The vertical component of this force will push the ply 222 up and produce the interfacial compression between the ply 222 and the tread belt 212 as the ply 222 expands.

Compression can not be produced between the ply 222 and the tread belt 212 unless the ply 222 moves closer to the tread belt 212 irrespective of the inflation pressure. Even though the ply line 220 expands in the crown and contracts in the mid sidewall 216 as previously discussed, the ply 222 will be assumed to grow uniformly for upper limit estimates of interfacial pressure. The vertical component of the ply growth if the ply 222 was expanding by the same amount in all directions will be defined as the "Vertical Pressure Coefficient". As shown in FIG. 4 the vertical pressure coefficient can be calculated for these prior art flat belt layers as:

$$\text{Vertical Pressure Coefficient} = \sin \alpha \quad \text{(Equation 4)}$$

Where "α" is the included angle between the tangent to the ply line 220 and the line perpendicular to the belt layers at any point along the ply 222.

This coefficient was calculated for a 45.00R57 sized two-piece tire and plotted in FIG. 4. The vertical pressure coefficient is 1.0 at the center of crown 215 and 0.70" under the radially innermost belt edge 315 of the belt structure 300 as shown in FIG. 4. It is important to note that, the interfacial contact pressure between the carcass 214 and the tread belt 212 will decrease with decreasing Vertical Pressure Coefficient.

Figure 5:
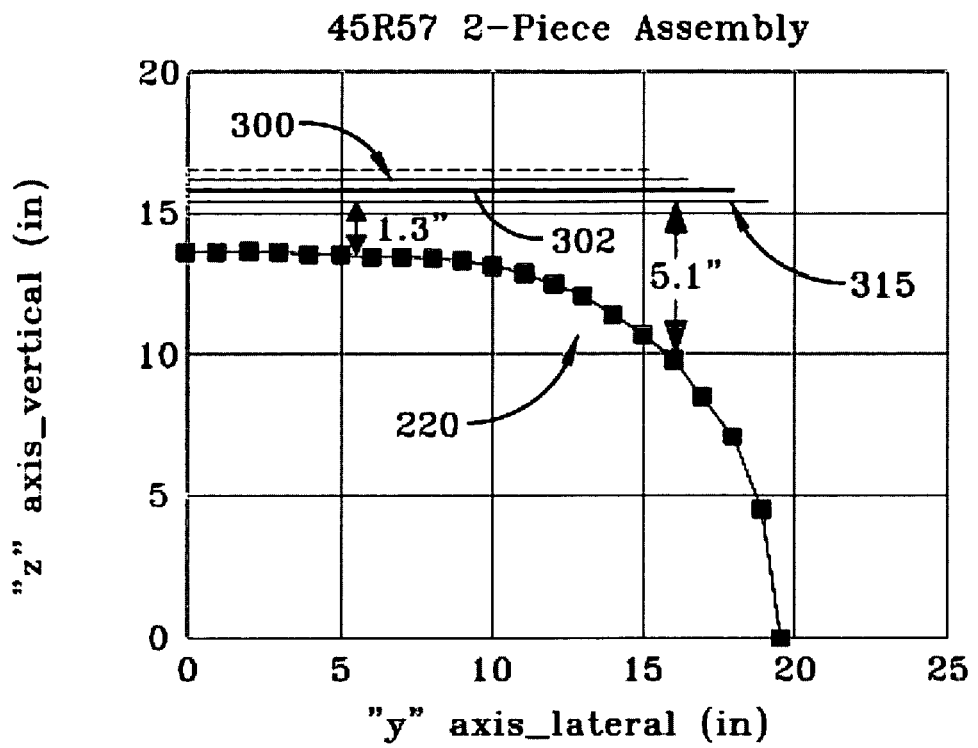
FIG. 5 is a graphical representation showing the gauge between the ply and the belt package of the exemplary prior art 45.00R57 two-piece tire assembly.

Amount of compressive strain, ε, over a given distance "L" is ΔL/L where ΔL is the decrease in length due to compression. As shown in FIG. 5, the gauge between the ply 222 and the bottom belt 302 is not constant.

The radial distance between the top of the ply 222 and the bottom of the first belt 302 is 1.3" at the crown center and 5.1" under the belt edge 315. Thus, to produce a uniform compressive strain (or a uniform compressive stress) between the carcass 214 and the tread belt 212, the radial movement of the ply 222 under the belt edge 315 should be at least (5.1/1.3) times higher than that at the crown center or equatorial plane EP. It should be noted that, the transverse constraint at the center of carcass 214 is much higher than that in the shoulder region since the upper sidewall 216 region can bulge out and relieve some of the compressive stress associated with the compressive deformation.

Note that reducing the tread belt width will bring the ply line 220 closer to the belt layers under the belt edges 315, reduce the effective gauge and increase the strain. Thus, lowering the radial distance between the belt edge 315 of the first belt 302 and the ply 222 of the tire carcass 214 will increase the interfacial contact pressure between the carcass 214 and the tread belt 212 at the belt edge 315. According to Equation 1, increasing the contact pressure will increase the threshold for shear stresses at the interface and may eliminate the possibility of slip between the carcass and tread belt at the lateral edges. The susceptibility of two-piece tire assemblies to interfacial erosion will be very low if slip is eliminated between the tread belt 212 and the carcass 214.

The interfacial pressure between the carcass 214 and the tread belt 212 is primarily controlled by the inflation pressure, ply line ellipticity and the belt package stiffness. The viscoelastic properties of compounds between the carcass 214 and tread belt 212 can also affect the interfacial pressure but these are secondary effects and will not be considered here.

The design geometry can be assumed to be close to the inflated geometry if the compounds between the ply 222 and the belt layers have enough stiffness to stop rubber flow under compression, and if the belt structure has enough circumferential stiffness to restrict the growth of carcass 214 due to inflation pressure. Considering these two assumptions, the interfacial pressure, $\sigma_{IF}$, can be approximated as $$\sigma_{IF} = (\text{inflation pressure}) * (\text{VPC}) * (L_o/L) \quad \text{(Equation 5)}$$

where VPC=vertical pressure coefficient (see Eq. 4); $L_o$=radial gauge between ply 222 and first belt 302 at crown 215 center and L=radial gauge between ply and first belt 302 at a given point.

Figure 6:
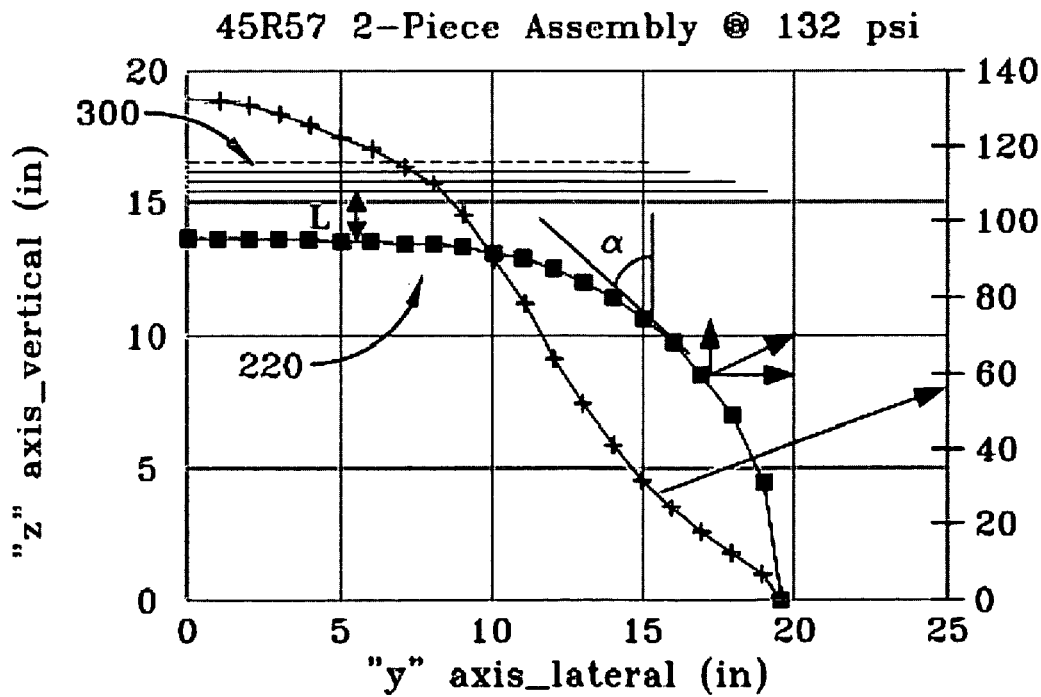
FIG. 6 is a graphical representation of interfacial pressure for the exemplary prior art 45 00R57 two-piece tire assembly calculated using the design drawings and plotted in for an inflation pressure of 132 psi.

The interfacial pressure for the 45.00R57 two-piece assembly was approximated using representative tire dimensions and plotted in FIG. 6 for an inflation pressure of 132 psi.

Note that, the interfacial pressure is 132 psi at the center of crown where the effect of inflation pressure is fully conveyed from the ply 222 to the belt structure 300 and below 20 psi at the belt edge 315 where VPC is relatively low and the gauge, L, is very thick.

Figure 7:
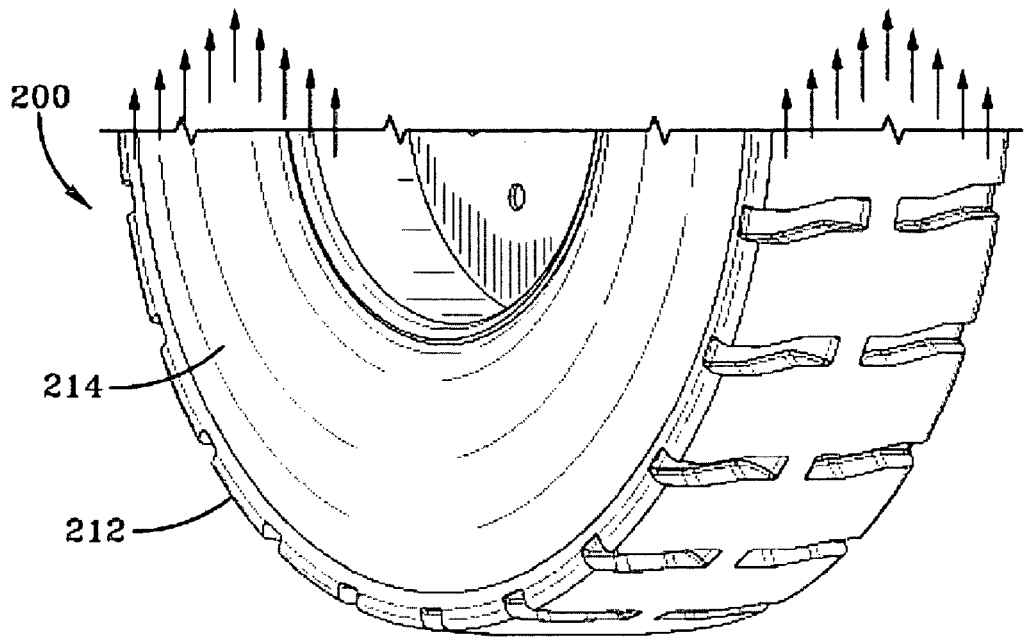
FIG. 7 is a partial perspective view showing the hoop load distribution across the prior art tread belt as shown in each end of the tread belt.

When a two-piece tire assembly 200 is inflated, the carcass 214 expands and exerts a radial force on the tread belt 212 producing the interfacial pressure as discussed in the previous sections. The interfacial pressure pushes the tread belt 212 out and produces a hoop load distribution in the circumferential direction. The hoop load distribution is not uniform across the width of the tread belt 212 as qualitatively shown in FIG. 7.

The hoop stress is not uniform across the ring thickness either since stiffer belts (with lower belt cord angles) carry more load and compliant belts carry a smaller portion of the hoop load produced by the interfacial pressure. Therefore, the hoop load per unit width will be more useful than the hoop stress in tire design process.

The hoop load per unit width across the tread belt 212 can be approximated as $$\text{Hoop load per inch}=(\sigma_{IF}/2)*(128.2) \quad \text{(Equation 6)}$$

where 128.2" is the inner diameter of a 40.00R57 tread belt. Hoop load distribution across the tread belt width was calculated using the information provided in FIG. 6 and plotted in FIG. 8.

Figure 8:
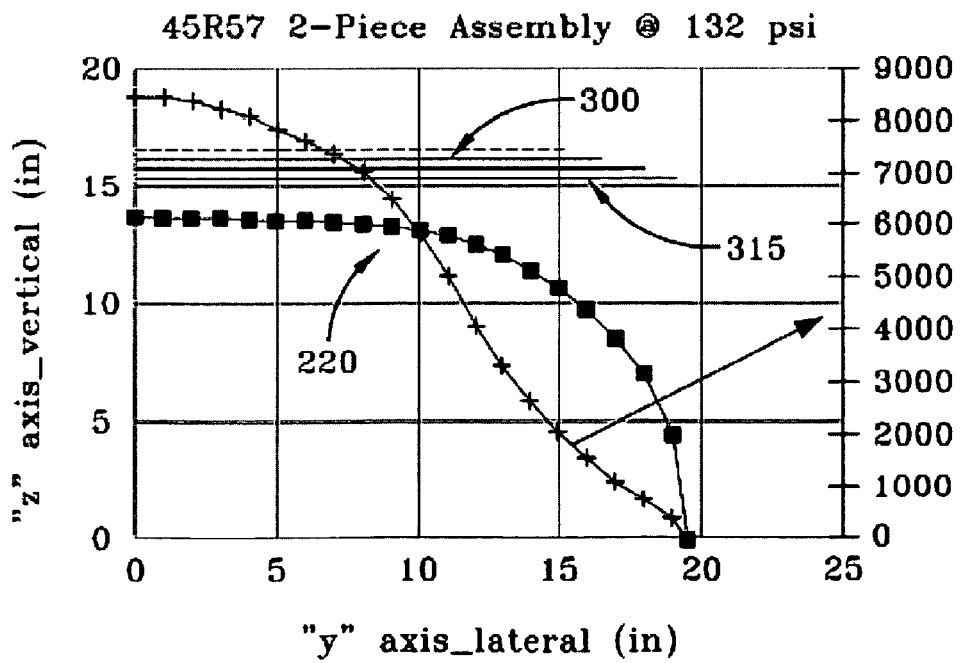
FIG. 8 is a graphical representation showing the hoop load distribution across the belt package width of the exemplary prior art 40.00R57 tread belt at 132 psi.

As shown in FIG. 8, the maximum load per inch is at the center of the tread belt 212 is equal to 8461 lb/in at 132 psi inflation pressure.

The load intensity decreases away from the center of the tread belt 212 and goes below 1000 lb/in at the belt edge 315. The total load carried by the belt structure 300 due to the inflation pressure can be found by integrating the load distribution along the entire belt width. At 132 psi the total load carried by a 45.00R57 tread belt 212 was calculated as 210,594 lb. This approximate value is an upper limit based on two assumptions introduced in the previous section. Thus, it is a conservative value and can be used to design tread belts for creep.

With this clear understanding of the general deformations and loads created by the use of a tread belt assembly 300 of two or more belt layers has led to important insights into a greatly improved tread belt design structure.

Figure 9:
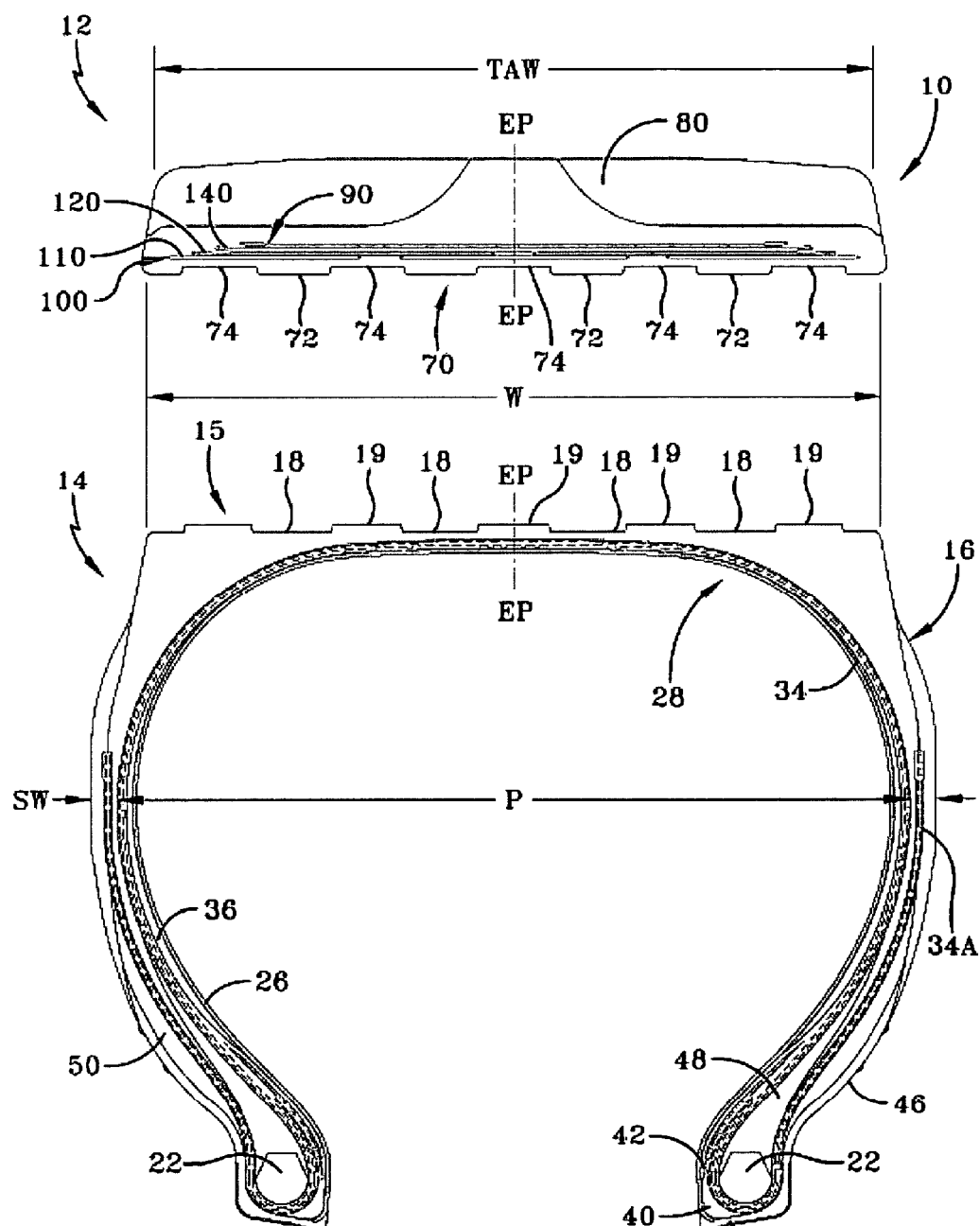
FIG. 9 is an exploded, cross-sectional view of a two-piece tire of the present invention.

FIG. 9 illustrates an exploded view of the cross-section of a two-piece pneumatic tire 10 of the present invention. While the invention would work for smaller tires, it is more applicable to very large tires with rim diameters on the order of 35 inches and above. Further, the two-piece tire 10 of the present invention is designed for very large, heavy earth moving equipment and rough terrain. The tires 10 are typically inflated to a high pressure, on the order of about 100 pounds per square inch (psi) or more with air, nitrogen or other appropriate gas mixtures.

Figure 12:
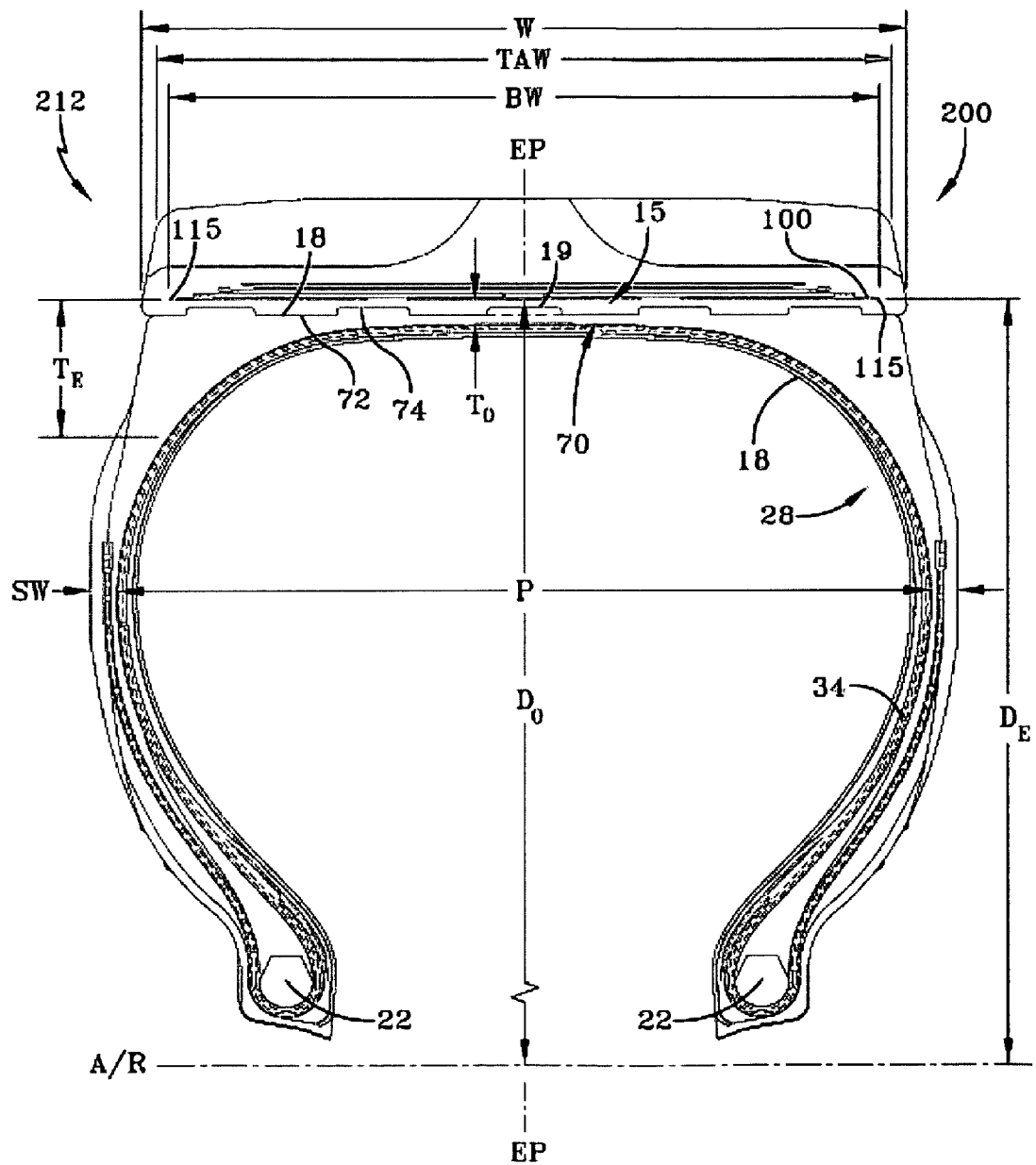
FIG. 12 is a cross-sectional view of the assembled tread belt and carcass forming a two-piece tire.

The improved two-piece pneumatic tire 10 of the present invention as shown in FIG. 12 includes a ground engaging, circumferentially extending tread belt 12 mounted on a radially reinforced, beaded tire carcass 14. The details of the construction of tire carcass 14 and tread belt 12 are described in more detail, below.

Figure 11:
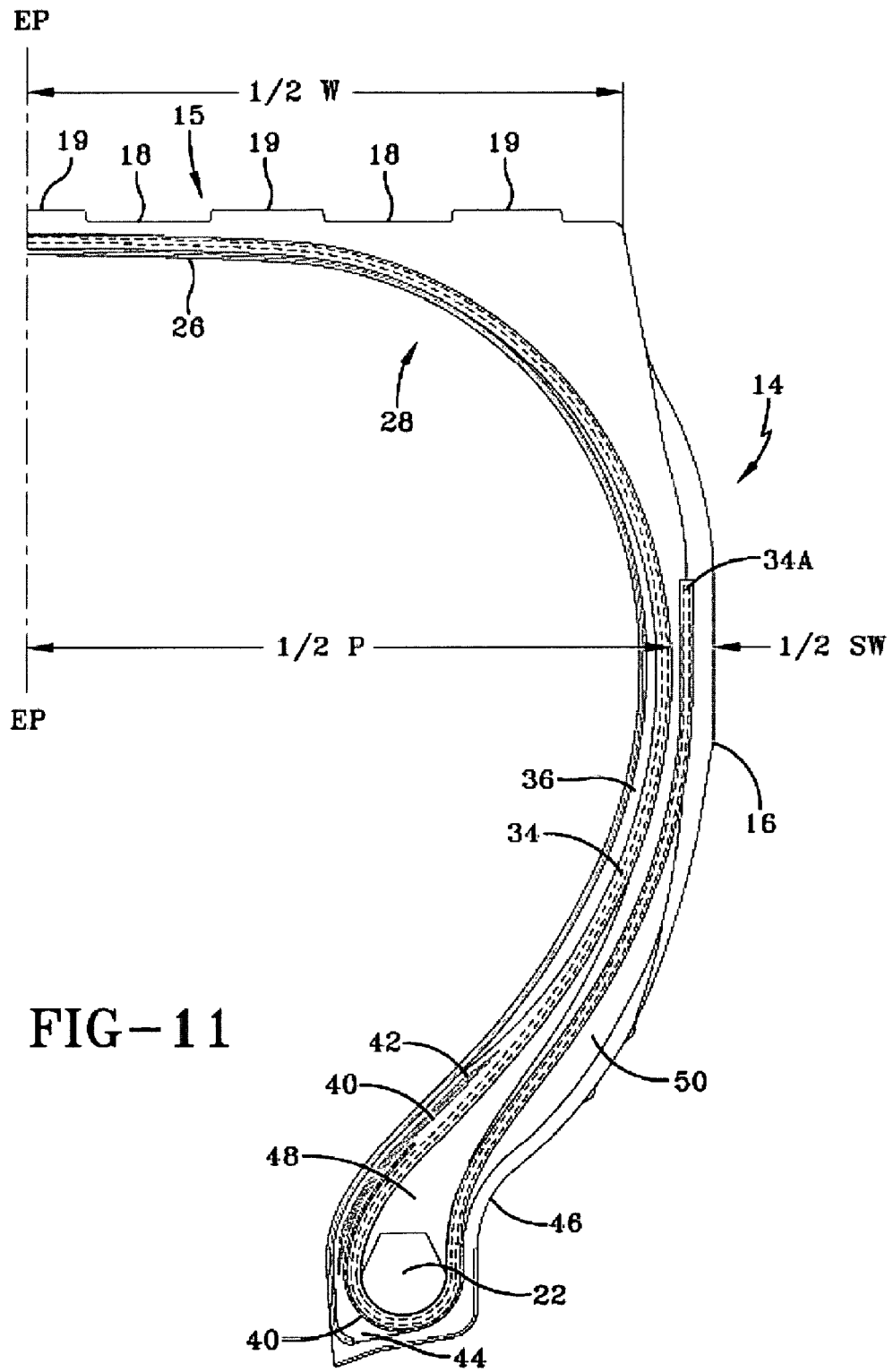
FIG. 11 is an enlarged, cross-sectional view of half of the carcass of the tire carcass shown in FIG. 9.

Referring to FIG. 11, one embodiment of a tire carcass 14 suitable for the invention is shown. The carcass 14 preferably includes a radially outer surface or crown 15 having one or more circumferentially continuous ribs 19 or grooves 18 for mating with aligned, opposing grooves 74 and ribs 72 of tread belt 12. Preferably, the outer radial surface 15 has a thin abrasion resistant compound layer 82 for forming a long-wearing surface between the tread belt 12 and the carcass 14.

The tire carcass 14 generally includes a pair of tire sidewalls 16 extending radially inwardly from the outer radial surface 15 of the tire carcass and terminating in the vicinity of bead wires 22.

The carcass further includes an inner ply liner 26 that covers the entire interior facing surface 28 of the tire carcass 14 and serves to hold the gas mixture that is used to inflate tire 10 within the carcass. The carcass 14 further includes in its construction at least one rubber laminated ply layer 34 of tire cord fabric which extends radially inwardly from the outer circumferential surface 15 of the tire carcass 14, also called the crown area 15 of the tire carcass 14, and has turn-up ends 34A which wrap or loop around a pair of bead wires 22. The bead wire 22 preferably has a rounded bottom edge. Although the carcass ply 34 is shown as being of single ply construction, a multi-ply construction can be employed if desired. Preferably, the carcass ply 34 is made of a rubber laminated ply of steel cord, but it can be made of a non-steel carcass reinforcing material.

Between the inner liner 26 and the ply layer 34 is an optional barrier rubber layer 36 which backs up the entire length of ply layer 34 and is formed of a soft compound of rubber which squeezes against the ply layer 34.

An optional steel chipper 40 wraps around the ply 34 and the bead wire 22 and extends upwardly past the bead. The steel chipper 40 is preferably surrounded by one or more optional chippers 42 for further reinforcement of the bead area. Adjacent the chipper and surrounding the bead area is an inner chafer 44 and an outer chafer 46. A chipper pad 50 is located between chafer 46 and ply 34. A triangular shaped reinforcement member or apex 48 extends radially outward from the bead until about mid-sidewall. The apex 48 stiffens the bead area and helps to prevent the tire sidewall from bending over the flange (not shown).

Figure 10:
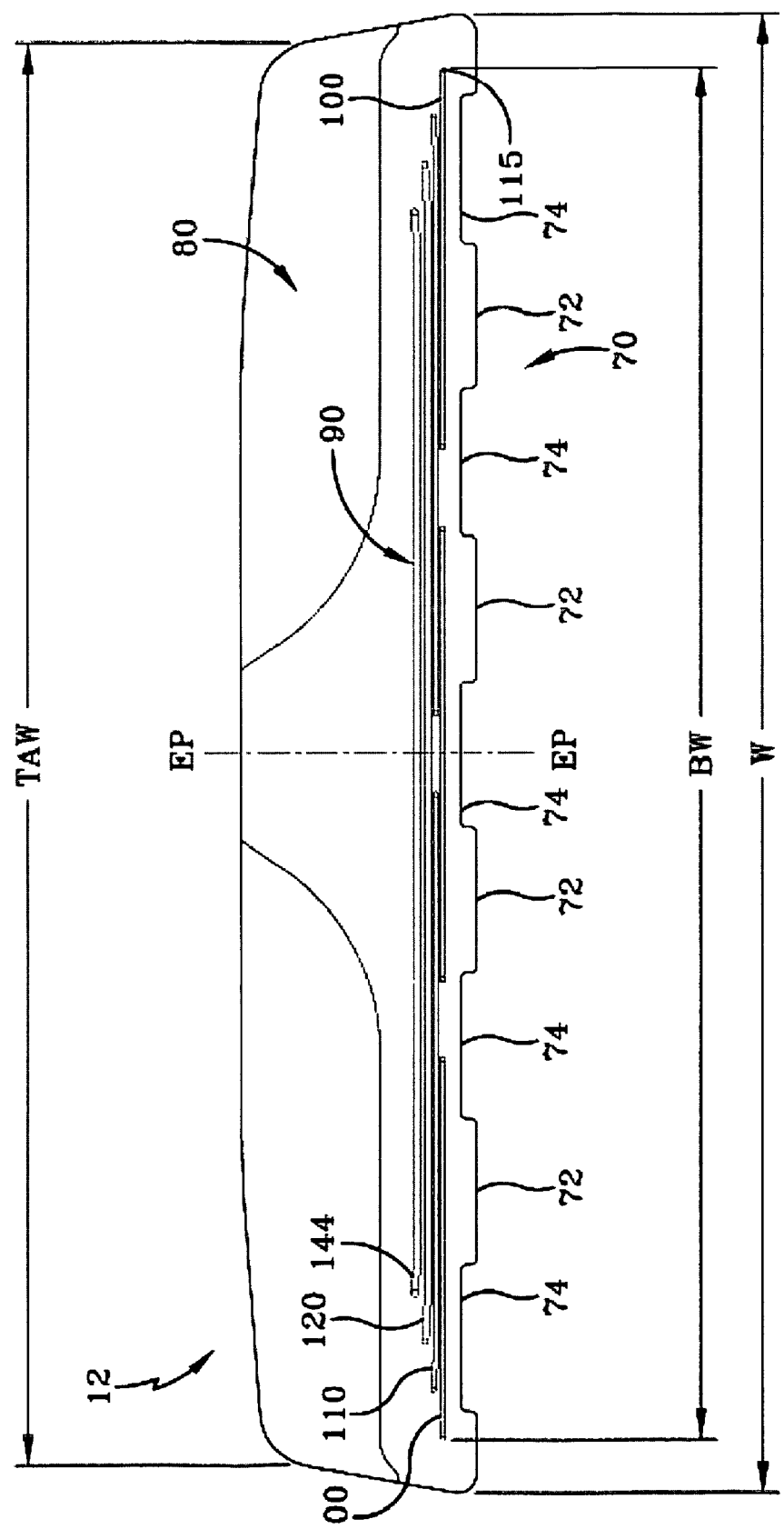
FIG. 10 is an enlarged, cross-sectional view of the tread belt shown in FIG. 9.

The ground engaging, circumferentially extending tread belt 12 is removably mountable onto tire carcass 14. As best shown in FIG. 10, the underside or inner circumference surface 70 of tread belt 12 comprises one or more annular ribs 72 or grooves 74 that mate with corresponding aligned grooves 18 and ribs 19 of tire carcass 14. The mating ribs and grooves function to position tread belt 12 with respect to the carcass 14 during assembly. The tire tread belt 12 includes a tread portion 80 on the outer radial surface for engagement with the ground.

The tread belt 12 further has a belt structure 90 having two or more belt layers 100, 110, 120, 130 wherein each belt layer is preferably comprised of steel cords. The invention is not limited to a particular wire construction, as there may be many wire constructions suitable for use with the invention. Each tread belt layer 100, 110, 120, 130 may comprise one or more belts.

The belt structure 90 may further include an optional outer layer 130 which has the steel cords oriented at 90 degrees relative to the circumferential direction.

EXAMPLE 1

Belt Package for a 42 Inch Wide Tread Ring

| Belt layer | Belt Angle | Belt Type | Cord Type | Total Belt Width |
|---|---|---|---|---|
| 100 | +20 | single belt | EP | 39 |
| 110 | 0 | single belt | EP | 37 |
| 120 | −20 | single belt | EP | 35 |
| 130 | 90 | single belt | EP | 34 |

The above chart describes an exemplary tread belt 12 having a belt structure 90 comprising four belts 100, 110, 120, 130 and is shown in FIG. 10. Belt layer 100 is the radially innermost or first belt layer, the wire cords having a bias angle of 20 degrees. Belt layer 100 is preferably the widest belt layer of all the layers. Belt layer 110 is located radially outward and adjacent belt layer 100, and has a belt angle of 0 degrees. The 0 degree belt layer 110 is used to provide a circumferential constraint in order to control the diametrical growth of the tire 10. Belt layer 120 is a single belt located radially outward and adjacent belt layer 110, and has a belt angle of −20 degrees. Belt layer 130 is also a single belt located outward of belt layer 120, and has a belt angle of 90 degrees. The four belt structure 90 is thus preferably widest at the radially innermost belt layer 100, and has a pyramidal structure with one inch belt stepoffs at the belt edge to eliminate high gradients in flexural stiffness in the radial cross section. The belt structure 90 has three active belt layers 100, 110 and 120 and two active belt interfaces designed to keep the hysteretic heat generation low and the operating tread ring temperature below critical temperatures.

The above describes a belt structure 90 comprising four belt layers. Belt 100 being the first layer is the radially innermost belt layer, and has one or more belts having a bias angle range of 20 to 45 degrees. If two or more belts are used in a layer, the belts are spaced apart a gap distance. Belt layer 100 has a width in the range of about 40 inches. A second belt layer 110 is located radially outward and adjacent belt layer 100, and comprises a belt angle of 0 degrees. One or more belts may comprise belt layer 110 and having a belt width about 38 inches. Belt layer 120 is located radially outward and adjacent belt layer 110, and has a belt angle range of −20 to −45 degrees, and a width in the range of about 36 inches. Belt layer 130 is located radially outward of belt layer 120, and has a belt angle of 90 degrees, and a width in the range of about 34 inches.

The interface between the tread belt 12 and carcass 14 in the above example and description of the invention is such that an interference fit occurs (the diameter of the tread belt is smaller than the diameter of the inflated carcass).

As shown in FIG. 12, the tread belt 12 and crown 15 of the carcass 14 are designed such that the interface between the inner surface of tread belt 12 and the outer surface of carcass 14 follows a relatively flat profile. Preferably this flat profile has a maximum distance $D_O$ between the axis of rotation and the radially inner surface of the radially innermost belt layer 100 as measured at the center or equatorial plane EP. The distance between the flat profile and the axis of rotation is constant as the point of interest moves away from the equatorial plane EP laterally outward on either side to the belt edge 115 of the belt 100.

Optionally a radius of curvature of the tread belt 12 could be used and preferably would follow the curvature of the ply line 20 maintaining a constant distance between the radially innermost belt and the ply line.

The current invention claims a substantial improvement in tire performance when the width W of the tread belt is substantially narrower than the maximum section width SW of the tire carcass. The inflated ply line has a maximum spacing between the sidewalls at RhoM (radial distance corresponding to the maximum tire section width) wherein the maximum width of the tread belt W is proposed to be less than the maximum width of the inflated ply line P, preferably less than 95 percent of P. The tread belt structure 90 has a belt layer maximum width BW wherein BW is preferably less than or equal to 0.85P, all measurements being at normal inflation pressure and under no load.

This design concept results in a stable tread supported by the pneumatic pressure when the footprint load is applied, eliminates the possibility of tread chunking at the belt edge and provides a superior cooler running tire with improved wear rates. The reduced tread width truncates the outer edges of the tread belt where the interfacial pressure is very low between the tread belt and the inflated tire carcass and eliminates the possibility of gaps as is shown in the prior art FIG. 1 on either side of the tire's footprint. The gaps are reduced if not eliminated by this enhanced mechanical fit which prevents getting any mud or debris into this area.

The reduction in carcass shoulder gauge which accompanies the reduced tread width decreases the heat generation in the upper shoulder, reduces the flexural deformations in the lower sidewall, improves durability in the bead area and reduces the possibility of chafing between the tire and rim.

As shown, the tread belt 12 at the innermost belt layers have a flat profile to the inner surface 70 of the tread belt 12. Narrowing the tread belt width TAW and the width W results in much higher interfacial pressure between the lateral edges 115 of the tread belt 12 and the inflated carcass 14 because the edges 115 are substantially moved radially closer to the ply line 20. With reference to chart 13, a graphical representation of the interfacial pressure distribution across the tread belt width of an exemplary tire 10 of the present invention is calculated and plotted for an inflation pressure of 132 psi. As shown, when compared to the prior art tire 200 illustrated in FIG. 6, the tire 10 of the present invention has a interfacial pressure distribution that is substantially higher at the lateral edges 115 of the tread belt 12. This increase in interfacial pressure increases both the durability of the tire 10 and its ability to avoid slippage between the carcass 14 and tread belt 12 as the tire 10 enters and leaves the footprint on each side of the contact patch. As a result the wear between these surfaces can be dramatically reduced.

As shown in FIG. 12, the belt structure 90 at the radially inner most belt 100 spaced a distance $T_O$ between the ply line 20 and the belt 100 at the equatorial plane EP. The radial distance $T_L$ between the ply line and the innermost belt increases across the axial width towards the lateral edge and reaches a distance $T_E$ at the lateral edges such that $T_O \leq T_E$.

Figure 13:
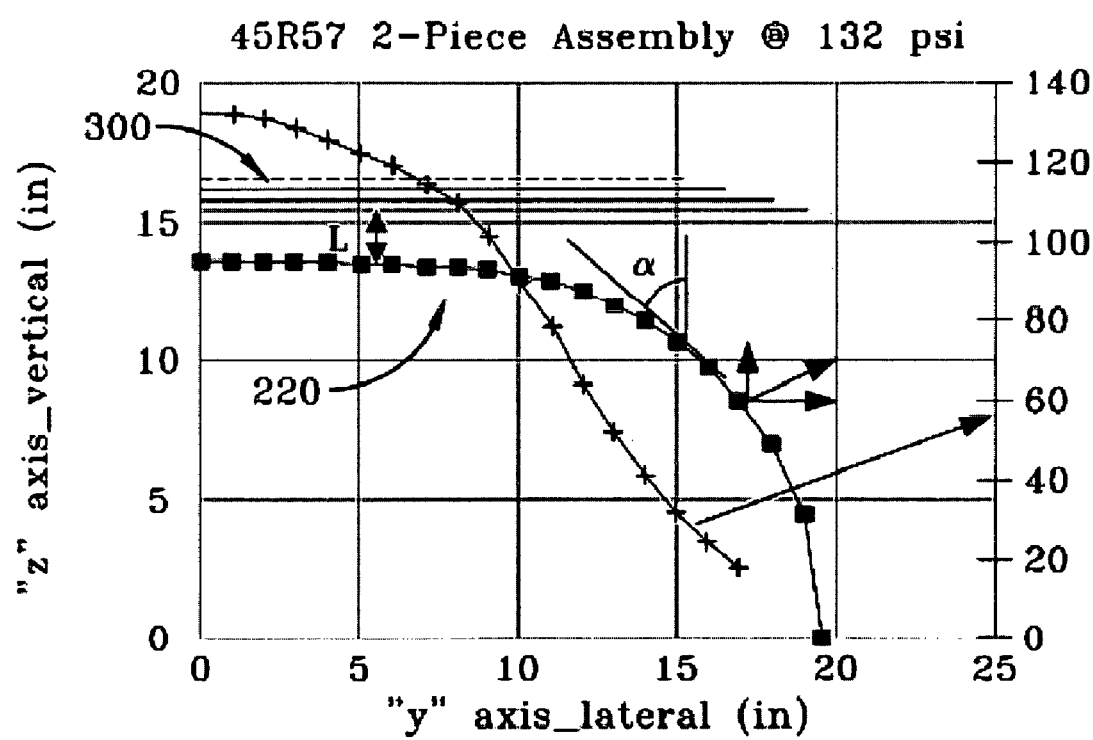
FIG. 13 is a graphical representation of interfacial pressure for the exemplary 45.00R57 two-piece tire assembly made according to the present invention, calculated using the design drawings and plotted in for an inflation pressure of 132 psi.

When compared to the prior art tire 200 having a $T_O$=1.3 inch at the center, as illustrated in FIG. 5 and $T_E$=5.1 inches at the lateral edge 315. Whereas the present invention tire 10 has $T_O$=13 inch at the center and $T_E$=2.5 inches at the lateral edges of the belt. This reduced distance $T_E$ at the lateral edges 115 of the tread belt 12 provides a higher interfacial pressure without changing the pressure distribution as shown in FIG. 13. For this reason it is believed that both the performance and fatigue life of a tread belt 12 are greatly improved by the use of a narrower width W tread belt 12 on a flat profile interface.

45.00R57 tires 10 made according to the present invention having a reduced width W of the tread belt 12 and a corresponding narrow belt structure 90 were molded. To simulate the reduced shoulder width in the carcass 14 an existing carcass of the prior art tire 200 was modified wherein the shoulders were shaved or cut using a water jet to reduce a massive amount of rubber in each shoulder of the casing. This removed material created a narrower width W of the carcass 14 to simulate the carcass 14 of the present invention two piece tire. These tires were then mounted on a vehicle and put into service. Decreasing the shoulder gauge of tire 10 was found to reduce the heat generation of the casing during normal use under heavy loads.

This reduction in tread width produced a slight increase in tire deflection and created a significantly higher flexural deformation in the upper sidewall where the gauge was reduced. Although, the flexural deformation was significantly increased the carcass was observed to run cooler in the upper sidewall region due to a significant reduction in rubber gauge.

Under comparable loading conditions the tires with reduced tread width were found to deform less in the lower sidewall region since mid-to-upper sidewall region would deform significantly more compared to control tires with wider tread width. As a result of reduced flexural deformation in the lower sidewall, the tires with narrower tread width 12 exhibited a reduced occurrence of chafing in the bead area around the rim and also improved ply ending durability of the carcass 14. Massive amounts of rubber in the upper shoulder as illustrated in the prior art tire 200 generate high amounts of heat as they are flexed in and out of the footprint of the tire 200. This heat is transmitted throughout the tire carcass structure 214 and in particular can weaken the ply ending area 34 or the belt package of the tread belt 12 in such a way that the tire durability or useful life can be reduced. By eliminating this rubber, a significant reduction in heat buildup occurs in the carcass 14 of the present invention.

The combination of reducing the width of the tread belt 12 and reducing the gauge in the shoulder of the carcass 14 provides a footprint such that the tire 10 becomes more compliant in the upper sidewall but reduces deformations in the lower sidewall of the carcass 14 which improves fatigue durability in this region of the tire 10. The amount of weight reduced in the carcass 14 alone can be more than 500 pounds using the present invention.

By reducing the tread width W up to 2.5 inches per side to 37.00 inches as done in the experimental tire 10 from 42 inches of the prior art tire 200 while the contact area under load is about the same means the footprint length is increased while a corresponding reduction in width of the footprint occurs. This means that basically the same contact area is supporting the load, but the load is supported over a longer length. Subjecting fewer tread elements to the compressive load but keeping them longer in the footprint greatly reduces the hysteretic heat generation in the tread 80 and helps the tread belt run cooler. Additionally, by reducing the tread belt width W the interfacial pressure level at the lateral edges of the tread belt can be increased with no significant change in interfacial pressure distribution. At the tread belt and casing interface movement between the two components can generate erosion. By reducing the width W of the tread belt 12 such that it is moved inwardly relative to the shoulders of the carcass 14, the lateral edges of the tread belt 12 are subjected to higher levels of interfacial pressure. As a result, the tread belt gaps G are eliminated and therefore relative movement between the tread belt and carcass is dramatically reduced. This creates a tremendous benefit to improving the durability of the tire 10.

Figure 14:
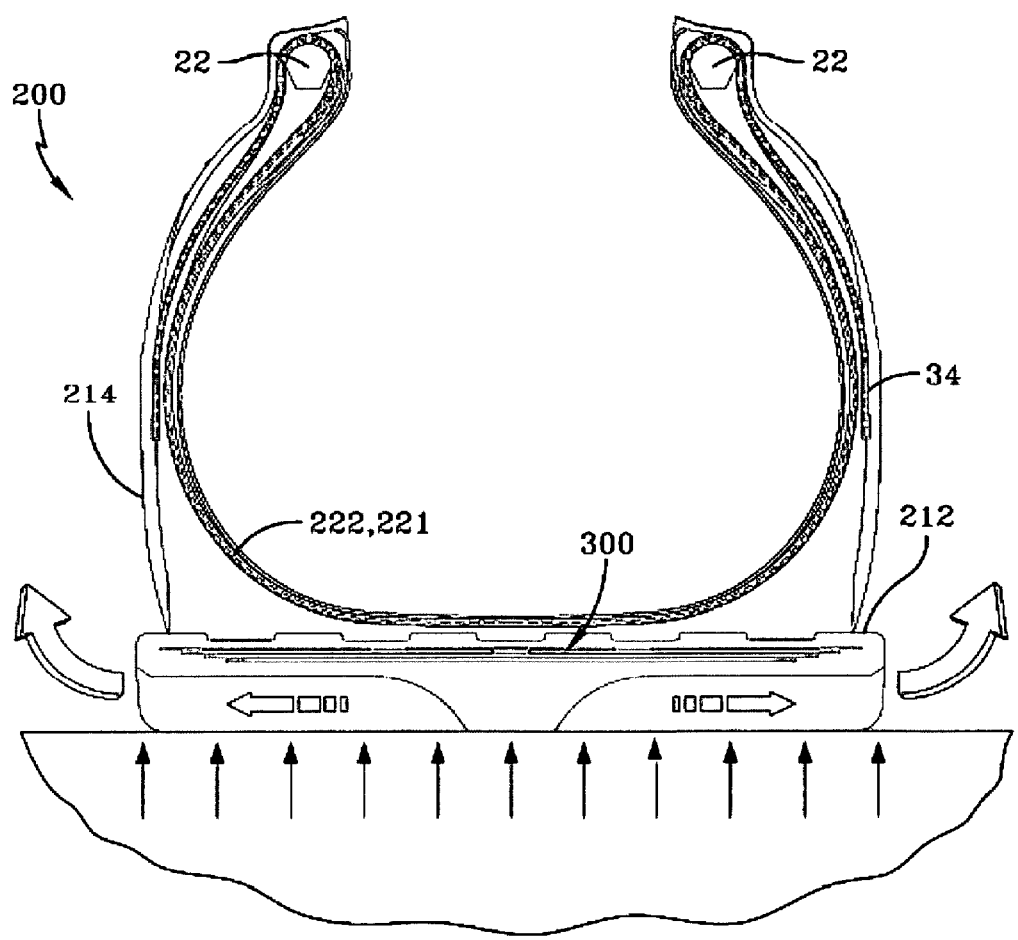
FIG. 14 is a graphical representation of the exemplary prior art 40.00R57 tread belt under a realistic footprint load showing the undesirable effect of bending moment at unsupported edges of the tread belt.

When compared to the prior art tire 200, the edges of the tread belt 212 are fundamentally unsupported, because the tread belt 212 extends laterally beyond the carcass ply 34 and in some cases even overlaps the shoulder 216 of the carcass 214. This creates a cantilevered beam effect laterally across the tread belt 212 wherein the tread belt 212 can flex upward and downward as the tire 200 enters and leaves the footprint. This is clearly shown in FIG. 14. This occurrence of flexure of the tread belt 212 may produce circumferential tread cracking at hinge points and adversely affect the durability of the tread belt.

By reducing the width W of the tread belt 12 relative to the carcass 14 as shown in the present invention, it is noted that the durability of the combination of a narrowed tread belt 12 and the reduced gauge in the shoulder of the carcass 14 can increase the useful life of the tire 10 dramatically thereby reducing the operating costs and down-time to the owners of the vehicles which is a substantial improvement. Historically the prior art tread belt 212 was designed to be wider to help protect the carcass 214, but in doing so it created a higher level of heat buildup in the tread belt and the carcass which is known to be detrimental to the durability of the entire tire structure. By reducing the weight of the tire 10 by over 500 pounds it was shown that a slight loss in cut protection was a desirable compromise since the life of the tire 10 could be improved by over 500 percent in some cases.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A large two-piece tire assembly with a rim diameter of 35 inches or more with a removable tread belt for installing about the circumference of a tire carcass comprises:
   a tread belt having two or more belt layers, each belt layer having one or more belts;
   wherein the maximum width of a belt layer is BW and the radially innermost belt layer is the widest belt layer;
   a tire carcass having a radial cord reinforced ply structure extending from a pair of bead structures across a crown of the tire carcass to form an inflated ply line; and
   wherein the tread belt and carcass when viewed in cross section have a width W and SW respectively wherein the tread belt width W is less than the carcass maximum section width SW and reducing the tread belt width lowers a radial distance $T_E$ between the belt edge of the radially innermost belt and the ply line and a radial distance $T_L$ between the radially innermost belt layer of the tread belt and the ply line increases constantly from $T_O$ to $T_E$ as the point of interest moves laterally from an equatorial centerplane EP to the belt edge, $T_O$ being the radial distance between the innermost belt and the ply line at the centerplane EP and $T_E$ being the radial distance between the innermost belt edge and the ply line, and the interfacial pressure $\sigma_{IF}$ can be approximated as $\sigma_{IF}$ (inflation pressure)*(VPC)*($L_O$/L) where VPC equals vertical pressure coefficient; $L_O$ equals the radial gauge or distance between ply and first or radially innermost belt at the centerplane EP and L equals the radial gauge or distance between ply and first or radially innermost belt at a given point wherein $L_O$ equals $T_O$ and L equals $T_L$ and at the lateral edge is $T_E$, $T_O$ being less than $T_E$, $T_O$ equals 1.3 inches at the center and $T_E$ equals 2.5 inches at the lateral edges of the belt for a 45 R 57 sized tire, wherein the tread belt width W is less than a maximum width P of the inflated ply line of the carcass and $W \leq 0.95P$, wherein each belt layer is substantially parallel to the curvature of the inner tread surface of the tread belt and wherein the maximum width of a belt layer is BW and $BW \leq 0.85P$.

2. The two-piece tire assembly of claim 1 wherein the tread belt has one belt layer having 0 degree cord angles relative to an equatorial centerplane EP of the tread belt.

3. The two-piece tire assembly of claim 2 where the tread belt has two belt layers having cords oriented in opposite cord angles relative to the other belt layer, the cord angle being greater than 20 degrees.

4. The two-piece tire assembly of claim 3 wherein the cord angle is in the range of 20 to 45 degrees and the cord angles in each of the two belt layers are equal but oppositely oriented.

5. The two-piece tire assembly of claim 3 wherein the two belt layers are each adjacent the 0 degree cord layer one lying radially above and the other radially below the 0 degree layer.

6. The two-piece tire assembly of claim 3 further comprises a fourth belt layer wherein the fourth belt layer has cords oriented at 90 degrees relative to the equatorial plane. The fourth belt layer is radially outward relative to the other belt layers.

7. The two-piece tire assembly of claim 1 wherein the tread belt has a radially inner surface having a width W as measured across the inner surface excluding any ribs or grooves for interlocking attachment to the tire carcass; and wherein the radially innermost belt layer of the tread belt at the equatorial centerplane EP has a radial distance $D_O$ as measured from the axis of rotation and a radial distance $D_E$ at each lateral edge of the innermost belt layer as measured from the axis of rotation such that $D_E$ equals $D_O$.

* * * * *